Aug. 22, 1961   M. J. ST. JOHN   2,997,628
SEQUENCE BUS PANELBOARD
Filed Nov. 19, 1956   2 Sheets-Sheet 1

INVENTOR.
MICHAEL J. ST. JOHN
BY
Paul S. Martin
ATTY.

Aug. 22, 1961      M. J. ST. JOHN      2,997,628
SEQUENCE BUS PANELBOARD
Filed Nov. 19, 1956      2 Sheets-Sheet 2

INVENTOR.
MICHAEL J. ST. JOHN
BY Paul S. Martin
ATTY.

United States Patent Office 2,997,628
Patented Aug. 22, 1961

2,997,628
SEQUENCE BUS PANELBOARD
Michael J. St. John, Essex Fells, N.J., assignor to Federal Pacific Electric Company, a corporation of Delaware
Filed Nov. 19, 1956, Ser. No. 623,119
4 Claims. (Cl. 317—119)

The present invention relates to circuit breaker panelboards, including both terminal panel assemblies for receiving circuit breakers selected by the user, and finished panelboards complete with the appropriate circuit breakers. The present invention will be described in detail below in connection with an embodiment that is specially adapted for use with a three-wire single phase input power line but, as will be evident to those skilled in the art, certain aspects of this invention apply also to three-phase input as well as to other types of power lines having two or more wires requiring circuit breaker protection.

An object of this invention is to provide a terminal panel assembly for receiving circuit breakers as well as a circuit breaker panelboard containing appropriate circuit breakers in assembly, wherein a novel form of sequence bussing is provided. The provision of a sequence bussing arrangement makes it possible to use a substantial number of two-pole circuit breakers, such as are often needed for heavy electrical loads in a three-wire single-phase installation. Examples of there are air conditioners, electric dryers, electric ranges, hot air heaters, power tools and branch panels. A number of two-pole breakers may be assembled side by side in a row or in two parallel rows, the poles of each two-pole breaker being respectively connected to different poles of a sequence-bus assembly.

Seqeunce bussing in circuit breaker panelboards and load centers may be variously accomplished as, for example, in the manner shown in Patent 2,739,272, issued to A. R. Norden, on March 20, 1956. An object of the present invention is to provide a novel and more compact sequence-bussed terminal panel assembly and circuit breaker panelboard.

The nature of the invention and further objects and features of novelty will be apparent from the following detailed disclosure of an illustrative embodiment. In that embodiment a wellknown form of circuit breaker is employed having a male projecting contact and where the terminal panel assembly includes apertured terminal plates for receiving the male circuit breaker terminals. However, it will be appreciated that broader concepts here involved apply also to circuit breaker panelboards in which other forms of connection are involved as, for example, where the circuit breaker incorporates a terminal clip and the terminal panel assembly embodies male terminal elements received by such circuit breaker clips.

The illustrative embodiment is shown in the accompanying drawings which form part of the present disclosure. In the drawings.

Figure 1:
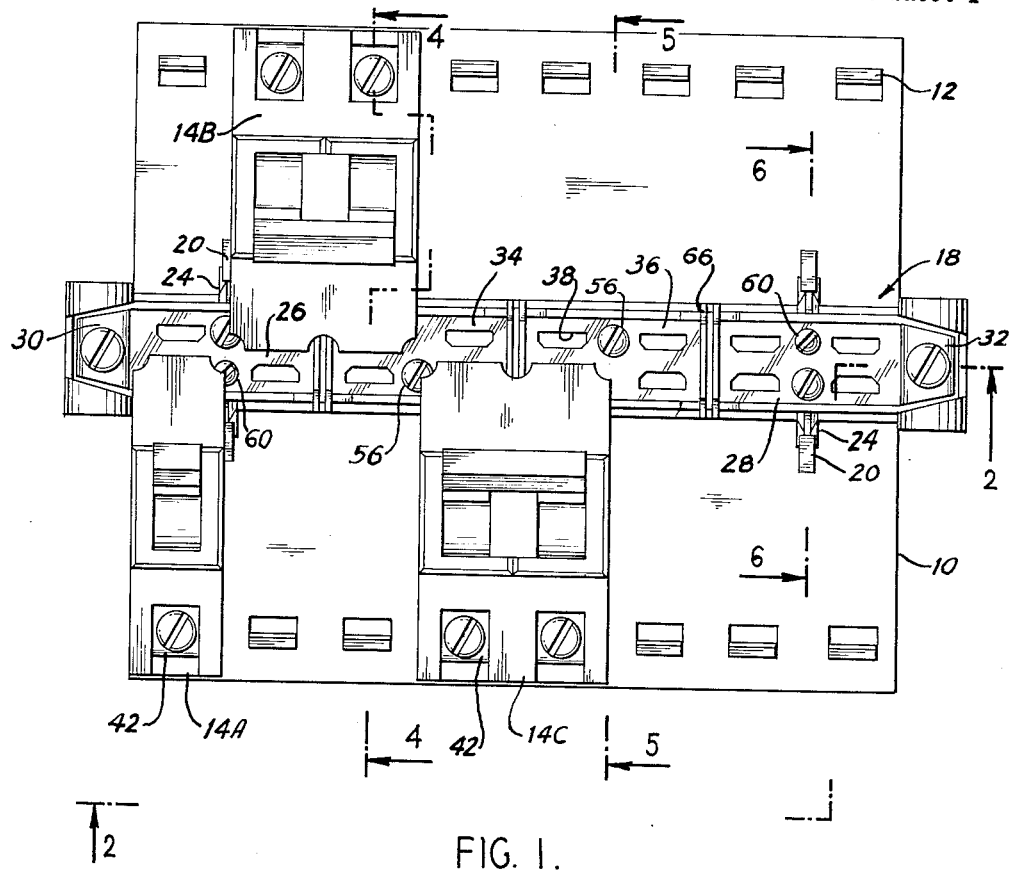
FIG. 1 is a plan view of a circuit breaker panelboard involving a terminal panel assembly and a number of circuit breakers mounted thereon with available space for additional circuit breakers.
Figure 2:
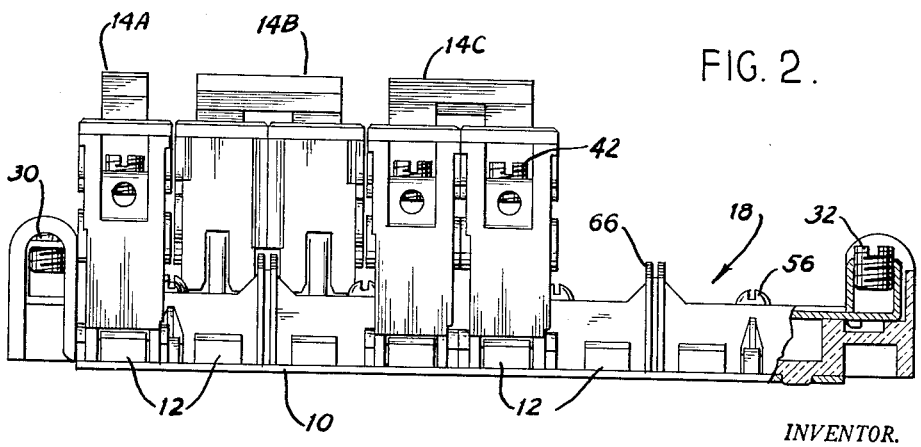
FIG. 2 is an elevation of the panelboard in FIG. 1, shown partly in section along the line 2—2 of FIG. 1.
Figure 3:
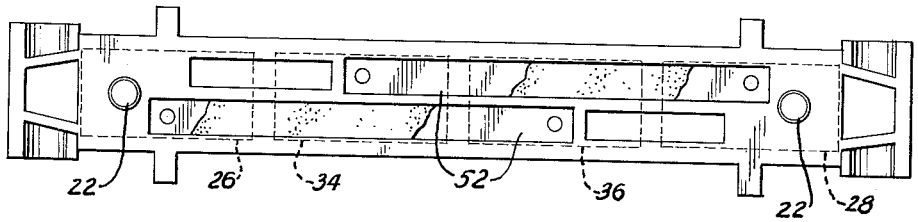
FIG. 3 is the bottom plane view of a sequence bus assembly, being a component part of the panelboard in FIGS. 1 and 2.

In the drawings, there is shown a circuit breaker panelboard for receiving any desired number of circuit breakers up to a maximum, both single-pole and two-pole, some of the circuit breakers being shown in their installed positions. This panelboard usually is mounted within a suitable enclosure (not shown) and a trim plate or frame (not shown) customarily conceals the space surrounding the circuit breakers. The handles of the circuit breakers are freely exposed and accessible for operation except that a door is sometimes provided. Additionally, panelboards customarily have a trim plate in the form of a frame (not shown) for improved appearance of the panelboard and for protecting and concealing the wiring.

Figure 4:
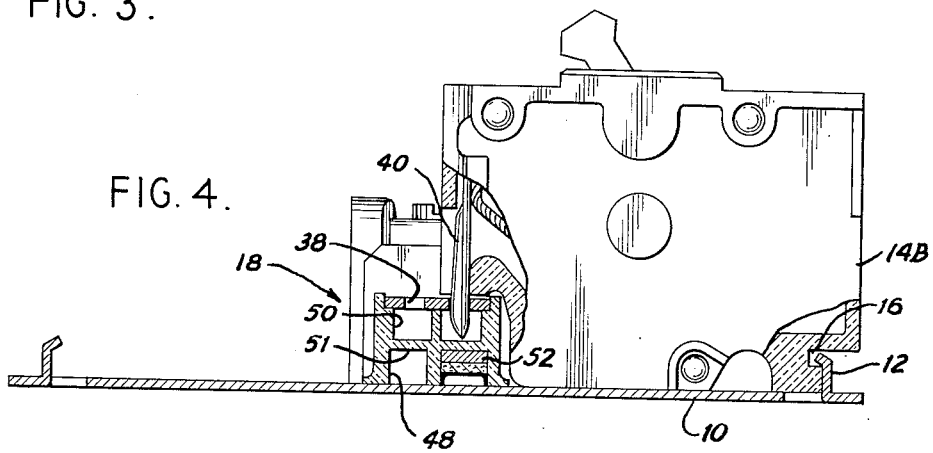
FIG. 4 is a cross-section of the device in FIG. 1 taken along the line 4—4 therein.

Referring now to the drawings, there is shown a base plate 10 of sheet metal. Two rows of hooks 12 are struck up from base plate 10, which constitute retaining elements for two rows of circuit breakers 14A, 14B and 14C. As best shown in FIG. 4, these retaining elements or hooks 12 cooperate with recesses or like formations 16 in the circuit breakers.

A sequence bus assembly 18 is disposed on base plate 10 midway between the two rows of hooks 12. The bus assembly is held against the base plate by overhanging ears 20 struck up from that base plate and bent over against lateral projections 24 of the bus assembly. A pair of projections 22 protrude from the bottom of the bus assembly 18 into holes (not shown) in the base plate for arresting the bus assembly against sliding endwise.

As seen in FIG. 1, bus assembly 18 includes a pair of circuit-breaker terminal plates 26 and 28 having integral formations 30 and 32, which constitute line terminals for the bus assembly. The novel bus assembly includes an additional pair of circuit-breaker terminal plates 34 and 36. Each of the terminal plates has plural openings or apertures 38 for tightly receiving a complementary "stab" or male terminal 40 that projects from each circuit breaker (FIG. 4). These "stab" terminals fit tightly in the openings 38 so as to provide firm electrical contact; and they also act to firmly retain the circuit breaker in the inserted position illustrated. When a circuit breaker is to be inserted, it is positioned with the male terminal 40 raised well away from the bus assembly but with its recess 16 engaged by hook 12. This hook and recess is thus used as a separable hinge to guide the male circuit breaker terminal 40 toward the opening 38 opposite the particular hook 12 engaged by that circuit breaker. The male terminal 40 is driven into the opening 38 in its terminal plate 26, 28, 34 or 36, and the installation of the circuit breaker is complete. It should be understood that a screw terminal 42 is provided on each circuit breaker, and this screw terminal is used to make a connection to a branch circuit wire before the circuit breaker is physically installed.

Terminal plates 26, 28, 34 and 36 are supported on the upper surfaces 44 of an elongated molded support 46 of insulation, and recesses or cavities 50 are formed therein below opening 38 for receiving the projecting portions of the circuit breaker terminals 40. Lateral projections 24, previously mentioned, extend integrally from this support. At the side of the support 46 opposite surfaces 44 there are formed a number of elongated recesses 48. Recesses or cavities 50 are separated from the elongated recesses 48 by a wall 51. Bars 52 of copper or like electrical conductor are disposed in recesses 48. One of these bars 52 interconnects terminal plates 26 and 36 whereas the other bar or conductor 52 interconnects terminal plates 34 and 28. Included in the interconnections are a number of screws 54, which are threaded into bars 52, and spaces or separating sleeves 56 of copper or the like. Screws 54 are effective to pull the terminal plates 26, 28, 34 and 36 against the top surfaces 44 of the insulating support 46, and these same screws establish the mechanical and electrical connection of those terminal plates to the bars or conductors 52.

The insulating support 46 has ribs 58 formed along the top thereof, defining the marginal edges of the surfaces 44 which support the terminal plates. These ribs also resist any tendency of the terminal plates to twist or shift out of position. Additionally, screws 60 provide additional mechanical securing means for plates 26 and 28 which have the integral line terminals 30 and 32.

Figure 5:
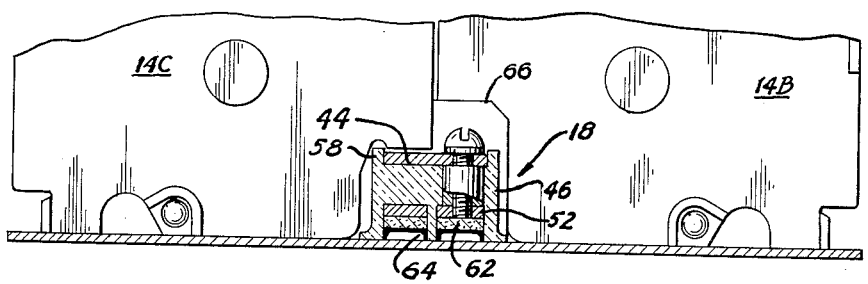
FIG. 5 is a cross-section of the panelboard in FIG. 1 along the line 5—5.
Figure 6:
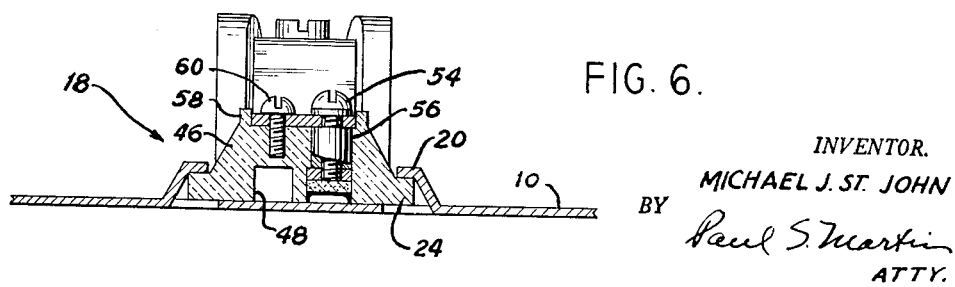
FIG. 6 is a fragmentary cross-section along the line 6—6 of FIG. 1.

As seen in FIGS. 4, 5 and 6, bars 52 have a barrier or covering of insulation, including a strip of fibre 62 and an adhesive coating of insulation 64 which holds the fibrous strips 62 in place and which eliminates any possible surface leakage path from bars 52 to base plate 10. This insulation is used where, as usual, bars 52 operate at the potential of one line terminal 30 or the other therminal 32, and base plate 10 is to operate at ground potential.

As seen in FIGURES 1, 2, 4 and 5, each terminal plate 26, 28, 34 and 36 is separated from the next adjacent terminal plate in the row of terminal plates by a double-rib or barrier of insulation 66, that guards against surface leakage at line-to-line voltage.

The circuit breaker panelboard illustrated evidently will receive a large number of single-pole circuit breakers 14A, in as many positions along the two sides of sequence-bus assembly 18 as there are openings 38 in the terminal plates. Additionally, at each position along the row where one of the circuit breaker terminal plates adjoins another, there is the possibility of mounting a two-pole circuit breaker, such as two-pole circuit breakers 14B and 14C appearing in FIG. 1. The panelboard illustrated in FIG. 1 will accommodate six 2-pole circuit breakers, this panelboard having a pair of 2-pole circuit breakers flanking each insulating barrier 66. This panelboard represents an obvious improvement over the panelboard illustrated in the patent to Cole et al. No. 2,647,225 which shows only two circuit breaker terminal plates. The sequence bus assembly here involved accommodates circuit breakers of the same form as those previously used, in which the circuit breaker is supported with its bottom flush against the base plate, and with the circuit breaker from which the "stab" terminal projects having a portion which overlies the bus assembly. The sequence bus feature is achieved with no additional space demands over the previous panelboard not having this feature. Additionally, sequence bussing as illustrated avoids the need for changes in the enclosures used for such circuit breaker panelboards.

It will be evident to those skilled in the art that the embodiment of the invention here illustrated, intended for a distribution line having two "hot" lines at both sides of neutral may readily be expanded to polyphase applications, with only detailed mechanical changes. Since this and other variations will occur to those skilled in the art, the present invention should be broadly construed in accordance with its full spirit and scope.

What is claimed is:

1. In combination, a sequence-phased plug-in circuit breaker panelboard and a plurality of elongated circuit breakers disposed thereon in two confronting rows, the circuit breakers in each row being side by side with the plug-in terminals thereof disposed in a row adjacent to the plug-in terminals of the confronting row of circuit breakers, each of said circuit breakers being of generally rectangular outline but having a recess in place of a corner at the plug-in terminal thereof and further having a long and narrow bottom portion, said panelboard including a substantially flat base plate and means retaining the circuit breakers on the base plate with said bottom portions substantially in contact therewith, and a bus assembly including a molded insulator fixed on said base plate and received in said recesses of said circuit breakers, that improvement comprising a series of at least three terminal members on said insulator having individual formations cooperating with said circuit breaker plug-in terminals, respectively, a pair of line terminals, said insulator having elongated laterally adjacent recesses therein at the side thereof opposite said terminal members, conductors in said recesses underlying the terminal formations in said terminal members, said conductors having connecting means extending through said insulator to respective ones of said terminal members and arranged to connect alternate ones of said terminal members to each other and to a respective one of said line terminals, said terminal members confronting said conductors and said insulator providing integral portions covering each said conductor that is not connected to the confronting terminal member above it, said conductors collectively being of approximately the same transverse extent as said terminal members.

2. A circuit breaker panelboard including a substantially flat base plate, a sequence bus assembly disposed medially thereon, and two rows of hook-like mechanical retaining elements projecting from said substantially flat base plate at opposite sides of the sequence bus assembly and spaced uniformly therefrom, the retaining elements and the sequence bus assembly being adapted to receive and retain two rows of circuit breakers at opposite sides of the sequence bus assembly, said sequence bus assembly including at least three exposed terminal plates having apertures for receiving male plug-in terminals of circuit breakers, a narrow elongated molded insulating support of a given width carrying said terminal plates in a row and with said terminal plates disposed parallel to said base plate and extending across nearly all of the given width of said insulating support, said sequence bus assembly having a pair of terminals for connection to separate wires of a power line, a pair of said aperture terminal plates being separated in said row by an intervening terminal plate, and a connecting bar disposed in a recess in said molded insulating support on the side thereof opposite to that which supports said terminal plates, respective connecting devices extending from each of said pair of separated terminal plates to said connecting bar which underlies said separated terminal plates, said pair of plates being connected to one of said line terminals, and a further bar interconnecting said intervening plate and the other of said line terminals, said further connecting bar underlying said terminal plates and being received in a recess in said molded support at the side thereof opposite said terminal plates, a connecting device between said intervenig plate and said further connecting bar, said connecting bars having insulating covering on the side thereof facing said base plate, said connecting bars and said connecting devices being entirely contained within said insulating support, the extent of the assembled connecting bars and said connecting devices transverse the narrow molded insulating support being substantially the same as the transverse extent of said terminal plates on said insulating support, each of said terminal plates extending across both said connecting bars and providing apertures in the region above said connecting bars for engagement with and penetration by the male terminals of plug-in circuit breakers, said terminal plates confronting said connecting bars and said molded insulating support including integral portions disposed below each terminal plate covering each said connecting bar that is not connected to the confronting terminal plate above it.

3. A circuit breaker panelboard including a substantially flat base plate, a sequence bus assembly medially thereon, and two rows of mechanical retaining elements projecting from said substantially flat base plate at opposite sides of the sequence bus assembly and spaced uniformly therefrom, the retaining elements and the sequence bus assembly being adapted to receive and retain two rows of circuit breakers at opposite sides of the sequence bus assembly, said sequence bus assembly including at least three terminal members disposed in a row, a narrow elongated molded insulating support of a given width carrying said terminal members at the side thereof remote from said base plate, said terminal members extending across nearly all of the given width of said insulating support, said sequence bus assembly having a pair of line terminals, one of said line terminals being connected to a pair of said terminal members and including a connecting bar at the side of said support opposite said terminal member and extending between a pair of said terminal members separated from each other by an intervening terminal member of said row, said intervening terminal member being connected to the other of said line terminals by a further connecting bar received in a recess in said molded support at the side thereof opposite said terminal members, a layer of insulation interposed between said connecting bars and said base plate, said connecting bars being collectively narrow enough to underlie said row of terminal members, said terminal members embodying connection means for said rows of circuit breakers in the region where said terminal members overlie said connecting bars, said terminal members confronting said connecting bars and said molded insulating support including including integral portions underlying each terminal member and arranged to cover the underlying connecting bar to which such confronting terminal member is not connected.

4. In combination, a circuit breaker panelboard including a substantially flat base plate at least one row of circuit breaker retaining elements extending from said base plate, a sequence bus assembly fixed to said base plate, said assembly having a row of terminal elements providing circuit breaker contacts, and at least one row of circuit breakers each having a formation for engagement by one of said retaining elements and each having a terminal cooperatively engaging one of said terminal elements, said sequence bus assembly further including an elongated molded support of insulation of a given width holding said terminal elements in spaced position above said base plate, said terminal elements extending across nearly all of the width of said molded support, said support having recesses on the side thereof facing said base plate, connecting bars underlying said terminal elements and disposed in said recesses and having connecting elements extending through said molded support and said connecting bars being arranged to interconnect alternate ones of said terminal elements, said terminal elements and said connecting bars being substantially co-extensive, measured transverse of said molded support of insulation, said circuit breaker contacts of said terminal elements occupying a region extending directly above and transversely of said connecting bars, said terminal elements confronting said connecting bars and said molded support including integral portions covering each connecting bar in the region where it underlies a confronting terminal element to which said connecting bar is not connected.

References Cited in the file of this patent
UNITED STATES PATENTS

| | | |
|---|---|---|
| 1,686,289 | Milano | Oct. 2, 1928 |
| 2,343,178 | Frank | Feb. 29, 1944 |
| 2,351,942 | Dyer | June 20, 1944 |
| 2,570,229 | Hammerly | Oct. 9, 1951 |
| 2,647,225 | Cole | July 28, 1953 |
| 2,737,613 | Morris | Mar. 6, 1956 |
| 2,739,272 | Norden | Mar. 20, 1956 |
| 2,760,123 | Wills | Aug. 21, 1956 |
| 2,815,396 | Bartlett | Dec. 3, 1957 |

OTHER REFERENCES

Federal Noark Catalog 1000A, July 1953, 3 pages.